(12) United States Patent
Holder (10) Patent No.: US 8,120,526 B2
(45) Date of Patent: Feb. 21, 2012

(54) METHODS, APPARATUSES AND SYSTEMS FOR LOCATING NON-COOPERATIVE OBJECTS

(76) Inventor: Ernest Jefferson Holder, Marietta, GA (US)

( * ) Notice: Subject to any disclaimer, the term of this patent is extended or adjusted under 35 U.S.C. 154(b) by 708 days.

(21) Appl. No.: 11/996,970

(22) PCT Filed: Jul. 26, 2006

(86) PCT No.: PCT/US2006/028859
§ 371 (c)(1),
(2), (4) Date: Jan. 15, 2009

(87) PCT Pub. No.: WO2007/016098
PCT Pub. Date: Feb. 8, 2007

(65) Prior Publication Data
US 2009/0167607 A1 Jul. 2, 2009

Related U.S. Application Data

(60) Provisional application No. 60/704,006, filed on Jul. 27, 2005.

(51) Int. Cl.
*G01S 13/08* (2006.01)
*G01S 13/00* (2006.01)
(52) U.S. Cl. ........... 342/140; 342/62; 342/139; 342/146
(58) Field of Classification Search .................. 342/453, 342/62, 118, 126, 133, 139–140, 146–147, 342/159
See application file for complete search history.

(56) References Cited

U.S. PATENT DOCUMENTS

| | | | | |
|---|---|---|---|---|
| 5,252,980 A * | 10/1993 | Gray et al. | .................... | 342/453 |
| 5,949,364 A * | 9/1999 | Katzberg et al. | .............. | 342/453 |
| 6,232,922 B1 * | 5/2001 | McIntosh | ...................... | 342/453 |
| 6,710,743 B2 * | 3/2004 | Benner et al. | ................. | 342/453 |
| 6,744,408 B1 * | 6/2004 | Stockmaster | ................. | 342/453 |

* cited by examiner

*Primary Examiner* — Thomas Tarcza
*Assistant Examiner* — Fred H Mull
(74) *Attorney, Agent, or Firm* — Daniel J. Santos (57) ABSTRACT

Measurements of the differential and/or absolute time-of-arrival of separable signals transmitted from a set of spatially-distributed (SD) transmitters are obtained by one or more receivers. The signals transmitted by each transmitter are made separable by encoding them in a manner that enables each signal to be distinguished from the others by the receiver or receivers. An accurate time-of-arrival of each signal at the receiver is determined, from which the path lengths from the transmitters to the receiver and from the receiver to the object are determined based on the known propagation speed of the signals. Any Doppler frequency shifts in each signal can also be determined from this information. From all of this information, the receiver is able to determine its own position, motion and orientation (roll, pitch and yaw), as well as the position and motion of the moving object being tracked by the receiver.

29 Claims, 8 Drawing Sheets

METHODS, APPARATUSES AND SYSTEMS FOR LOCATING NON-COOPERATIVE OBJECTS

CROSS REFERENCE TO RELATED APPLICATION

This application claims priority to provisional application Ser. No. 60/704,006, entitled METHODS, APPARATUSES AND SYSTEMS FOR PERFORMING OBJECT POSITION DETERMINATION, filed on Jul. 27, 2005, which is incorporated herein by reference in its entirety.

TECHNICAL FIELD OF THE INVENTION

The invention relates to systems for determining the position and motion of an object.

BACKGROUND OF THE INVENTION

Various techniques are currently used to determine the position and motion of a non-cooperative, but reflective, object while allowing a compatible receiver to determine its own position, orientation and motion. Current techniques for determining self-position, self-motion, and self-orientation primarily use an inertial guidance system, a satellite navigation system, or a combination of the two. Current techniques for determining the position and motion of a non-cooperative, but reflective, object primarily use radar systems.

An inertial guidance system provides the position, velocities, and attitude of a vehicle by measuring the accelerations and rotations applied to the system's inertial frame. A typical system will use angular accelerometers to measure how the vehicle is rotating in space (one sensor each for pitch, yaw, and roll), linear accelerometers to measure how the vehicle is moving in space (one sensor for each of the three axes), and include a gyroscopic element for maintaining an absolute positional reference. These measurements are combined to estimate acceleration, velocity, position, and attitude, starting from a known initial position. In general, inertial guidance systems suffer from an accumulation of measurement errors that result in progressively larger errors in velocity and position.

A satellite navigation system provides the position of a vehicle using signals transmitted from satellites. One satellite navigation system is the Global Positioning System (GPS). From the broadcast GPS satellite signals in view of a GPS receiver, a GPS receiver will determine its relative distance from the group of GPS satellites in space. GPS is not accurate enough for fine attitude (orientation) determination. Also, GPS signals may be jammed to prevent a GPS receiver from determining its position.

An inertial guidance system may be improved by incorporating a satellite navigation system. The satellite navigation system may be used to correct the accumulated measurement errors of the inertial guidance system. Neither of these navigation techniques, however, may be expanded to determine the position and motion of a non-cooperative, but reflective, object. Instead, an additional system is needed to accomplish this. A typical system would be a monostatic radar system. The radar system could be located onboard the vehicle or elsewhere. The radar system would transmit and receive radio waves reflected off the non-cooperative object. If the radar system were not located onboard the vehicle, then some means of communicating the information from the radar to the vehicle would be necessary.

A need exists for a way to determine the position and motion of a non-cooperative, but reflective, object that does not suffer from an accumulation of measurement errors, as with inertial guidance systems. A need also exists for a way to determine the position and motion of a non-cooperative, but reflective, object that does not require the transmission of signals from the vehicle, as with onboard radar systems. For a radar system that is not located onboard the vehicle, the radar search and track resources would significantly limit the number of vehicles and non-cooperative objects that could be tracked. A need also exists for a single system that is able to determine its own position, self-motion, and self-orientation while simultaneously determining the position and motion of a non-cooperative, but reflective, object.

SUMMARY OF THE INVENTION

The invention provides a system and method for tracking a moving object. The system comprises a spatially-distributed (SD) transmitter system comprising at least first and second transmitters that are spatially separated from each other, and at least a first receiver. Each transmitter transmits a coded signal, and the coded signals are coded with different codes that enable the coded signals to be distinguishable from each other. The first receiver is configured to receive the coded signals and separate the coded signals from one another. The receiver includes a processor that processes the separated signals to determine at least a position of the object relative to the receiver.

The method comprises receiving two or more coded signals in a receiver, separating the coded signals, and processing the separated signals to determine at least a position of the object relative to the receiver.

These and other features and advantages of the invention are described below in detail with reference to the detailed description, drawings and claims.

DETAILED DESCRIPTION OF THE EXEMPLARY EMBODIMENTS

The invention enables the position and motion of a non-cooperative, but reflective, object to be determined while also enabling a compatible receiver to determine its own position, orientation and motion. The invention is particularly suitable for use in situations in which the object is, for example, an explosive projectile or missile that is moving at a very high rate of speed and being tracked by a missile on which the receiver of the invention is mounted. As the missile being tracked moves, the receiver on the missile tracks the position and motion of the object while also determining the position, roll, pitch, and yaw of the missile on which the receiver is mounted. Thus, the missile on which the receiver is mounted is capable of precisely guiding itself to the missile being tracked and destroying it.

In accordance with the preferred embodiment of the invention, measurements of the differential and/or absolute time-of-arrival of separable signals transmitted from a set of spatially-distributed (SD) transmitters are obtained by one or more receivers. If more than one receiver is used, the receivers operate in concert. The signals transmitted by each transmitter are made separable by encoding them in a manner that enables each signal to be distinguished from the others by each compatible receiver. Then, an accurate time-of-arrival of each signal at the receiver is determined, from which the path lengths from the transmitters to the receiver and from the receiver to the object are determined based on the known propagation speed of the signals. Any Doppler frequency shifts in each signal can also be determined from this information. From all of this information, the receiver is able to determine its own position, motion and orientation (roll, pitch and yaw), as well as the position and motion of the moving object being tracked by the receiver. The manner in which these determinations are made is described below with reference to FIGS. 3-9.

Figure 1:
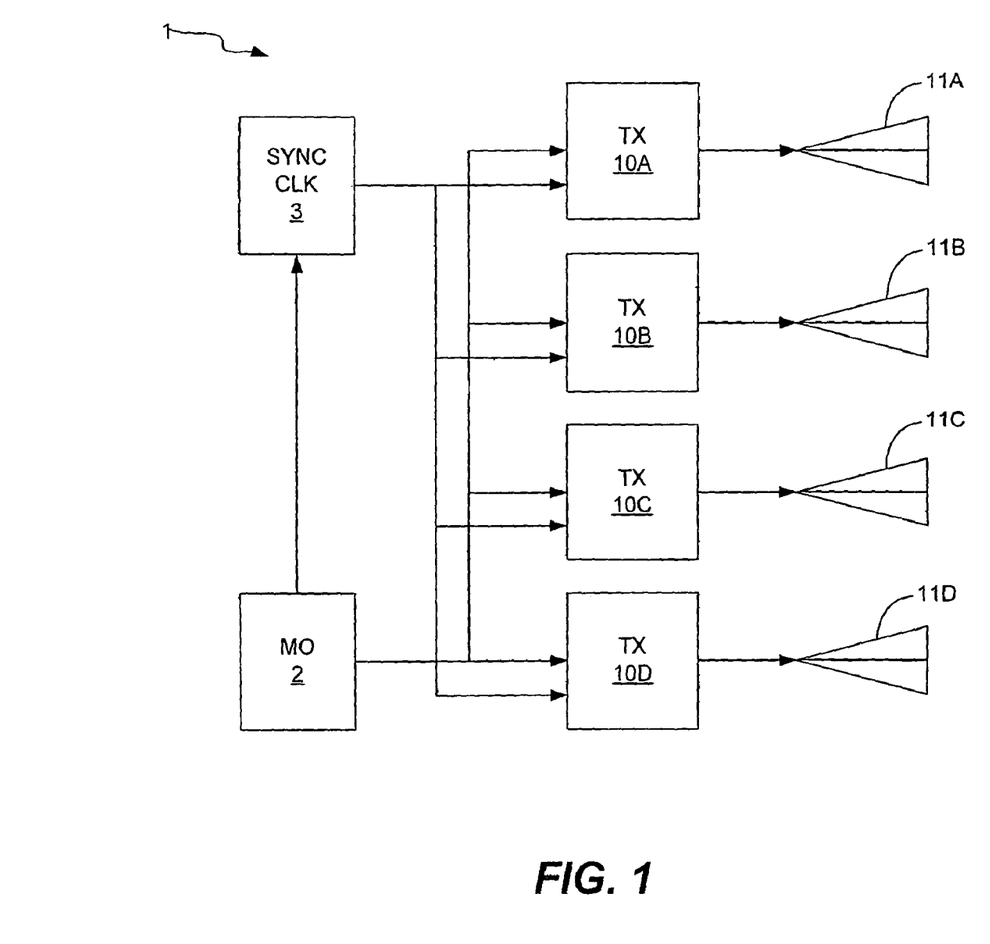
FIG. 1 illustrates a block diagram of the spatially-distributed (SD) transmitter of the invention in accordance with an exemplary embodiment.

FIG. 1 illustrates a block diagram of the spatially-distributed (SD) transmitter 1 of the invention in accordance with an exemplary embodiment. The SD transmitter system 1 comprises a plurality of transmitters 10A-10D. In the exemplary embodiment shown in FIG. 1, the SD transmitter system 1 is shown as having four transmitters 10A-10D, although two or more transmitters may be used. The transmitters 10A-10D are typically positioned such that a spacing of between about 1 meter and 10 meters exists between neighboring transmitters, although the invention is not limited with respect to the size of the spacing between the transmitters. The SD transmitter system 1 includes a master oscillator (MO) 2 that generates the common carrier frequency for each of the transmitters 10A-10D, and a synchronization clock (Sync Clk) 3 that modulates the carrier frequencies with codes. Each of the transmitters 10A-10D comprises a code generator (not shown) that receives the Sync Clk 3 and generates a code that is modulated onto the corresponding carrier wave in accordance with the Sync Clk 3. Each transmitter 10A-10D typically has an antenna 11A-11D associated with it that transmits the corresponding coded signal over the air, although one or more of the transmitters 10A-10D may share an antenna.

The Sync Clk 3 is typically derived from the MO 2 by dividing down the signal generated by the MO 2 by some factor. The MO 2 and the Sync Clk 3 may be external to the SD transmitter 1 or part of it. The signals produced by the transmitters 10A-10D preferably are orthogonal, or nearly orthogonal, to each other. This orthogonal coding enables the signals to be distinguished at the receiver. There are common signal coding and processing algorithms that are suitable for this purpose, including, for example, Time Division Multiplexing, Frequency Division Multiplexing, Code Division Multiplexing, Polarization Coding, or a combination of one or more of these algorithms.

The transmitters 10A-10D preferably are spatially distributed in such a way that a small positional difference of the receiver or of the object being tracked produces a relatively large differential path length difference between the coded signals. Several example scenarios for the transmitter spatial distributions are described below with reference to FIGS. 3-9.

Figure 2:
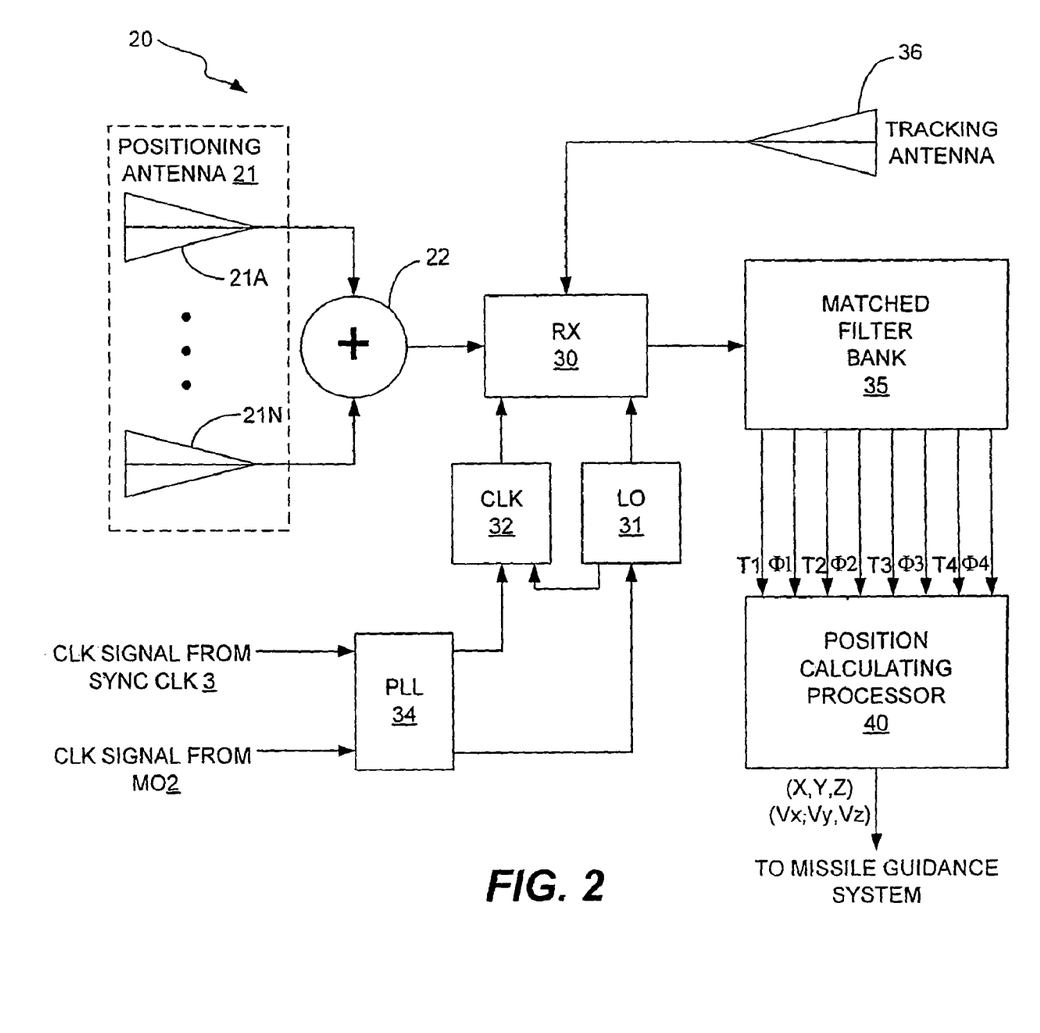
FIG. 2 illustrates a block diagram of the receiver of the invention in accordance with an exemplary embodiment configured to operate in conjunction with the SD transmitter shown in FIG. 1.

FIG. 2 illustrates a block diagram of the receiver 20 of the invention in accordance with an exemplary embodiment configured to operate in conjunction with the SD transmitter 1 shown in FIG. 1. A positioning antenna 21 of the receiver 20 receives the coded signals transmitted by the transmitters 10A-10D. The positioning antenna 21 may be a single antenna or an array of antennas. For exemplary purposes, the positioning antenna is shown in FIG. 2 as being an antenna array that comprises a plurality of antennas 21A-21N. The signals from each of the antennas 21A-21N are combined by a combiner 22, and the combined signals are provided to the receiver demodulation circuitry, RX 30.

A local oscillator (LO) 31 of the receiver 20 provides a clock signal to the RX 30 that is at the same frequency as the MO 2 of the SD transmitter 1, which enables the RX 30 to locate the transmitted signal. The clock, CLK, 32 is typically derived from the LO 31 by down-converting the LO signal to a signal that is at the frequency of the Sync Clk 3 of the SD transmitter 1. The clock CLK 32 is used by the RX 30 to demodulate the coded signals. The LO 31 and the CLK 32 preferably are synchronized to the MO 2 and the Sync Clk 3, respectively, just before launch of a missile that carries the receiver 20. This is typically accomplished by implementing a phase-locked loop (PLL) 34 in the receiver 20 that phase aligns the clock signal generated by LO 31 with the clock signals generated by MO 2.

A matched filter bank 35 of the receiver 20 receives the demodulated signal from the RX 30 and filters the signal to separate the coded signals from one another and determine the time, T, and phase, $\Phi$, of each respective signal. Because four transmitters 10A-10D are shown in FIG. 1, the matched filter bank is shown in FIG. 2 as outputting four sets of T and $\Phi$ values, each set corresponding to a respective one of the coded signals transmitted by a respective one of the antennas 10A-10D. A position calculating processor 40 of the receiver performs the position-calculating algorithm of the invention, which calculates the X, Y and Z Cartesian (or polar) coordinates of the receiver 20 and the velocity of the receiver in the X, Y and Z Cartesian (or polar) directions. Preferably, the processor 40 also calculates the orientation of the receiver 20, i.e., pitch, yaw and roll. The manner in which these calculations are made is described below with reference to FIGS. 3-9.

A tracking antenna 36 receives electromagnetic energy transmitted by the SD transmitter 1 and reflected from the object being tracked. The RX 30 receives the signal from the tracking antenna 36 and demodulates it and provides the demodulated signal to the matched filter bank 35, which decodes the signal into T and $\Phi$ values. These values are then provided to the position calculating processor 40, which processes the values in accordance with the position calculating algorithm and calculates the position of the object in X, Y and Z Cartesian (or polar) coordinates and the velocity of the object in the X, Y and Z Cartesian (or polar) directions. The manner in which these calculations are made is described below with reference to FIGS. 3-9.

The position and velocity information output by the processor 40 is typically provided to a missile guidance system (not shown), which uses the information to guide a missile on which the receiver 20 is mounted to the object, which may be, for example, a missile or projectile. Although the invention is being described with reference to guiding a missile to encounter a moving object, the invention is not limited to this particular use. Those skilled in the art will understand, in view of the description provided herein, the manner in which the principles and concepts of the invention can be applied to other uses.

Figure 3:
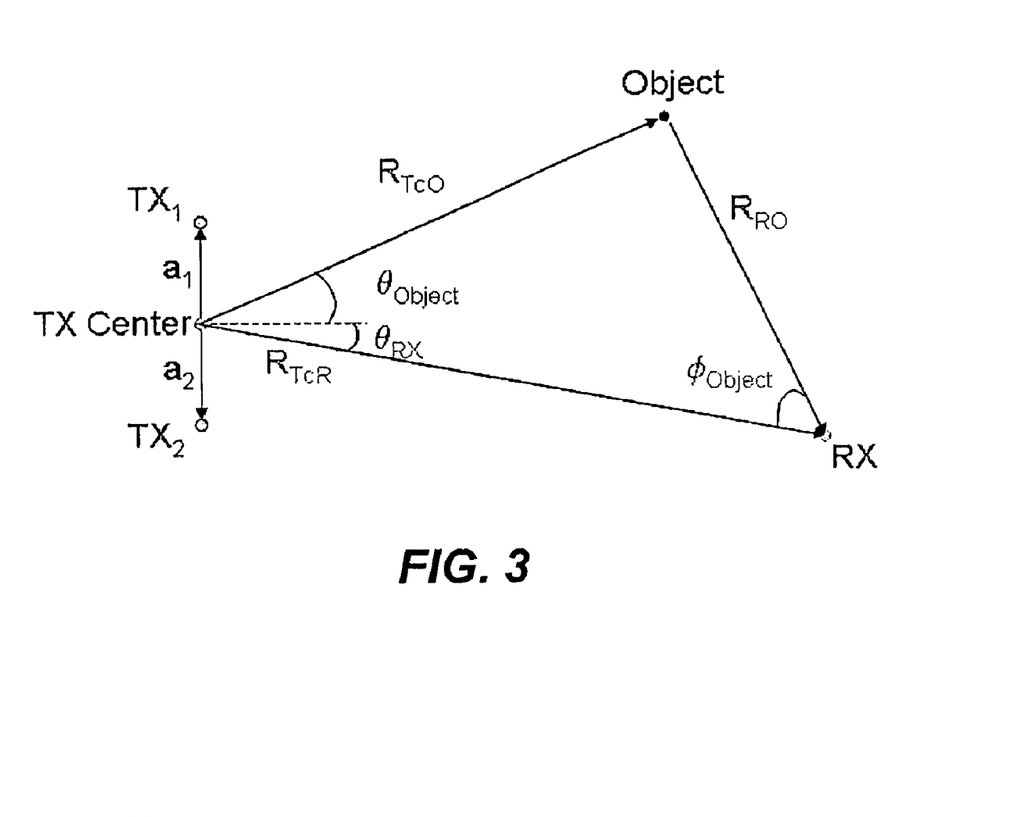
FIG. 3 is a diagram that illustrates the spatial relationships between a set of transmitters, $TX_1$ and $TX_2$, a receiver, RX, and a reflective object in two dimensions.

FIG. 3 is a diagram that illustrates the spatial relationships between a set of transmitters, $TX_1$ and $TX_2$, a receiver, RX, and a reflective object, O, in two dimensions. TX Center is the overall phase center of SD transmitter comprising $TX_1$ and $TX_2$. The range, $|R_{TcO}|$ from TX Center to the object and angular position, $\theta_{Object}$, of the object relative to the transmitter can be determined by the receiver of the invention. In addition, the receiver also is capable of determining the range, $|R_{TcR}|$, from TX Center to the receiver RX and the angular position, $\theta_{RX}$, relative to the transmitter. Consequently, the range, $|R_{RO}|$, from the receiver RX to the object and the angle, $\phi_{Object}$, of the object relative to the receiver RX can also be determined by the receiver RX using trigonometry, as will be understood by persons skilled in the art in view of the description provided herein. These determinations may then be used to guide a missile carrying the receiver RX to the object.

In order to make these determinations, the invention uses differential and absolute time-of-arrival measurements of the coded signals transmitted from the set of transmitters and received by the receiver, or by a set of receivers acting in concert. These time-based measurements and knowledge of the speed of the signal propagation enable calculations to be made of the differential and absolute path lengths over which the signals have traveled. These measured path lengths, in conjunction with knowledge of the transmitters' distributed layout, are processed to determine the precise relative position and orientation of the transmitters, receiver, and object being tracked.

In general, the transmitters will typically be spatially arranged relative to the receiver or receivers and object or objects of interest in such a way that the geometric dilution of precision (GDOP) is kept manageable, where GDOP is:

$$GDOP \propto \frac{R}{D\cos\theta},$$

where D is the distance between transmitters, R is the distance to the receiver from the object of interest, and $\theta$ is the angle that a vector connecting the center of the transmitter structure with the receiver or object of interest makes with a vector normal to the plane of the transmitters, which corresponds to the dashed line in FIG. 3.

GDOP is typically minimized by adding transmitters that are arranged such that any receiver and object can be precisely positioned by using a subset of the set of spatially distributed transmitters. The invention is not limited with respect to the number of transmitters or receivers used. However, the number of transmitters and receivers used in conjunction with a priori information must be sufficient to solve the necessary algebraic equations. For example, using four transmitters enables a receiver to be unambiguously located in an unconstrained three-dimensional volume, where no more than three transmitters lie in the same plane, and no more than two transmitters are co-linear. However, if the location of the object is known, fewer transmitters are required. For example, while four transmitters enable an object to be unambiguously located in three dimensions, three transmitters can be used to unambiguously locate an object in three dimensions under the constraint that the object can only be located on one side of the plane defined by the transmitter locations.

As stated above, the transmitters transmit unique coded signals, which is what allows the receiver or receivers to distinguish each received signal from the other received signals. The relative spatial relationship between transmitters and the temporal timing of the transmissions is known a priori. A general transmitter configuration for three-dimensional operation of the invention with no constraints on the receiver or object positions will be four or more transmitters arranged in a known configuration so that no more than two of the transmitters lie on a line and no more than three lie in any plane. In addition, while not required by the invention, each transmitter ideally transmits its coded signal in all directions at a time. Another typical transmitter configuration for three-dimensional operation is three or more non-colinear transmitters located in a plane and transmitting energy on only one side of the plane.

In order for the receiver to be able to determine its own position with reference to the transmitter, the receiver needs at least one antenna to collect the direct path signal from the transmitters. In order for the receiver to also be able to determine the position of the object, the receiver needs at least one antenna for collecting energy from the signal reflecting off the object. Typically, the receiver will be configured to determine its own position and orientation, as well as the position and orientation of the object relative to the receiver.

The times-of-arrival of the transmitted coded signals at the receiver are measured and the differences between these times are calculated. These differential time calculations and knowledge of the transmitter layout are then used by the processor 40 to determine the path lengths from the transmitters to the object, from the transmitters to the receiver and from the object to the receiver. If the receiver and transmitter clocks are synchronized at launch, as described above with reference to FIG. 2, then the absolute arrival times of the signals can also be determined. The absolute arrival times can be used to determine the absolute ranges, and consequently, the full position vector can be determined.

The processor 40 determines the path lengths by measuring the difference in time-of-arrival of the signals as described above or by measuring the differential phase $\phi$ of the signals. Use of relative phase measurements is called interferometry. Interferometry requires coherence in the transmitters. While either technique can be used to calculate the angle-of-arrival, the relative accuracy of the measurements is not the same. Interferometry improves the accuracy of this process by comparing the relative phase shifts of the received signals to provide a very accurate angle measurement. This can be seen by comparing the standard deviation of the errors made by using range measurements ($\sigma_R$) and phase differences ($\sigma_\phi$). These are:

$$\sigma_R = \frac{c}{2\beta\sqrt{SNR}}, \quad \sigma_\phi = \frac{c}{4\pi f \sqrt{SNR}}.$$

Given that the signal bandwidth is typically a small fraction of the carrier frequency (<10%), this means that the phase error is typically much smaller than the range error. However, in practice, both measurements are needed as the phase measurement has an ambiguity every $2\pi$. Therefore, typically the range-based measurements can be used to roughly establish the angle, and then the set of phase measurements will be used to more accurately establish the angle of arrival. Periodically changing the transmit frequency can also be used to resolve $2\pi$ phase ambiguities.

The determination of motion is made using the determined range and the differential change in the range of the signal propagation paths. Once the differential change in each path length has been determined, the combination of these values allows the motion of the receiver and object to be calculated by multiplying the unit position vector by the differential path length change. The algorithms that are performed by the processor 40 to compute the position and orientation of the receiver and object are straight-forward trigonometric calculations that can be easily made by persons skilled in the art. Therefore, in the interest of brevity, these calculations will not be described herein.

Figure 4:
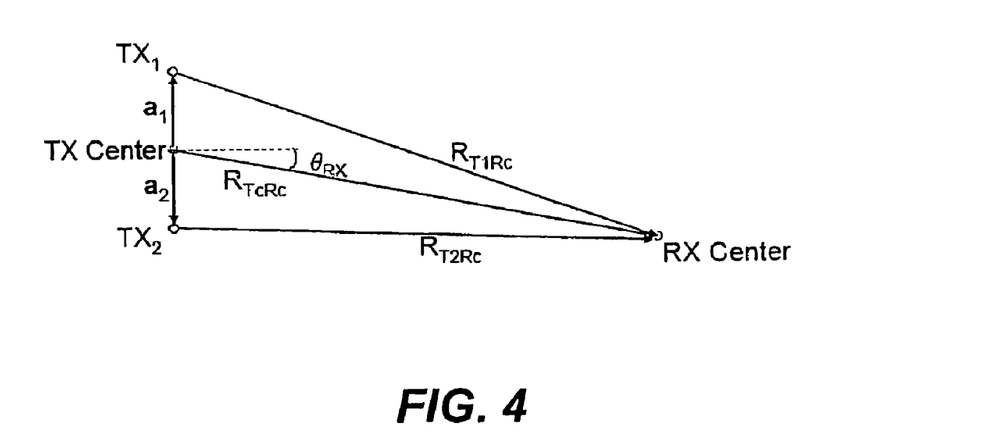
FIG. 4 is a diagram that illustrates the manner in which the position and orientation of the receiver can be determined using trigonometry in two dimensions.

FIG. 4 is a diagram that illustrates the manner in which the position and orientation of the receiver RX shown in FIG. 3 can be determined in two dimensions using trigonometry. In FIG. 4, $a_1$, $a_2$, $R_{T1Rc}$, $R_{T2Rc}$, and $R_{TcRc}$ are vectors. Given a known distance ($|a_1-a_2|$) between the transmitters $TX_1$ and $TX_2$ and the receiver, RX Center, the differential distance ($|R_{T1Rc}|-|R_{T2Rc}|$) from $TX_1$ and $TX_2$ to RX Center can be computed. RX Center is the overall phase center of the SD receiver comprising $RX_1$ and $RX_2$. Using this information, the angle $\theta_{RX}$ can be determined, where $\theta_{RX}$ is the angle between the perpendicular to the line between the transmitters and the line to the receiver from the TX Center. This may be accomplished by measuring the difference in time-of-arrival of the signals from each antenna and dividing by the speed of the signal propagation. In two dimensions, the differential range measurements and the angle relative to TX Center are related by the equation, $$|R_{T1Rc}|-|R_{T2Rc}|=(|a_1-a_2|)\sin\theta_{RX},$$

If the receiver clock is synchronized with the transmitter clock, it is possible to determine not only the relative difference in arrival time of the signals transmitted from $TX_1$ and $TX_2$ to RX, but also the absolute arrival time of the transmitted signals at RX. Using this information, it is then possible to determine the distance from RX to each of the transmitters $TX_1$ and $TX_2$. Using standard trigonometric equations, the distance from RX to TX Center can be determined. As will now be described, this two-dimensional system can be extended easily to three dimensions by adding one or more additional transmitters.

Figure 5:
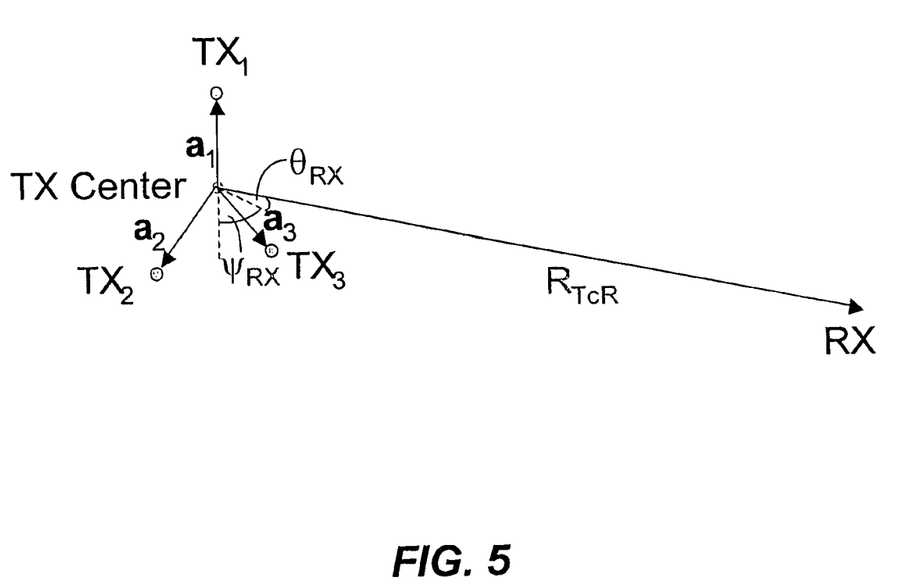
FIG. 5 is a diagram that illustrates the relationship between a set of transmitters, $TX_1$ and $TX_2$, a receiver, RX, and a reflective object in three dimensions.

FIG. 5 is a diagram that illustrates the relationship between three transmitters, $TX_1$, $TX_2$ and $TX_3$, and one receiver, RX, in three dimensions. In three dimensions, there are two angles ($\theta_{RX}$, $\psi_{RX}$) that need to be computed to determine position. However, these are algebraic equations with well-established solutions. The solution to the resulting position equations, under the assumption of synchronized clocks, is, $$|R_{TcRc}|^2 = \frac{|R_{T1Rc}|^2+|R_{T2Rc}|^2+|R_{T3Rc}|^2}{3}-\frac{|a_1|^2+|a_2|^2+|a_3|^2}{3},$$

and

-continued $$R_{TcRc}\cdot a_1 = \frac{|R_{T1Rc}|^2-|R_{TcRc}|^2-|a_1|^2}{2}$$

$$R_{TcRc}\cdot a_2 = \frac{|R_{T2Rc}|^2-|R_{TcRc}|^2-|a_2|^2}{2}$$

$$R_{TcRc}\cdot a_3 = \frac{|R_{T3Rc}|^2-|R_{TcRc}|^2-|a_3|^2}{2}$$

The term $R_{TcRc}$ represents the vector from the transmitter center, TX Center, to the receiver center, RX Center. The terms $R_{T1Rc}$, $R_{T2Rc}$, $R_{T3RC}$ represent the vectors from the transmitters $TX_1$, $TX_2$ and $TX_3$, respectively, to RX Center. The terms $a_1$, $a_2$, and $a_3$ represent the vectors from the transmitter center, TX Center, to each of the transmitters $TX_1$, $TX_2$ and $TX_3$, respectively. The derivation of these equations will be understood by those skilled in the art in view of this description.

Figure 6:
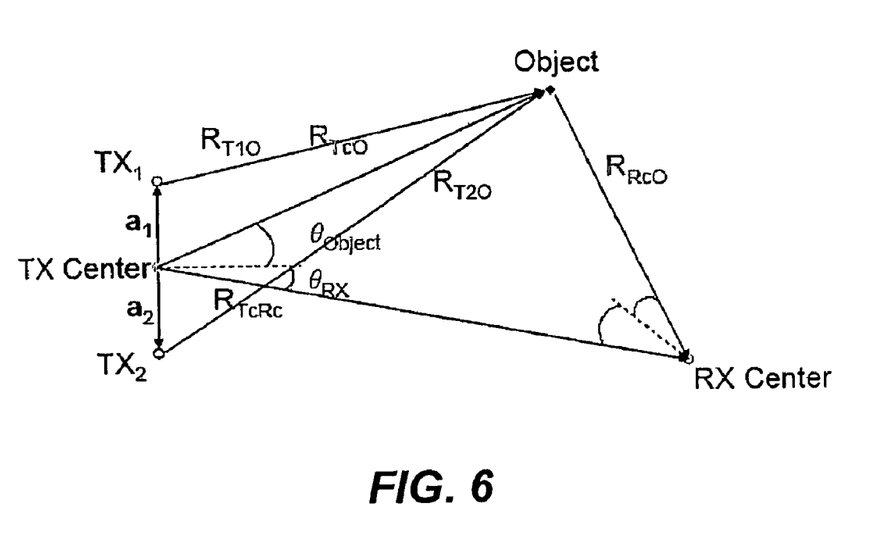
FIG. 6 is a diagram that illustrates the relationship between the transmitters, receiver and object in two dimensions.

FIG. 6 is a diagram that illustrates the relationship, in two dimensions, between two transmitters, $TX_1$ and $TX_2$, one receiver, RX, and an object being tracked. It should be noted once again, that in three dimensions, there are more choices for how to arrange the transmitters. In addition, there are more equations to be solved and two angles that need to be computed to determine position, as described above with reference to FIG. 5. However, as indicated above, the equations that may be used for this are algebraic equations with well-established solutions that are understood by those skilled in the art.

Once the position of the receiver has been determined using the algorithm described above, or through a priori knowledge, the position of any object reflecting the transmitted signal towards the receiver can be determined. With reference to FIG. 6, the values of the vectors ($a_1$, $a_2$, $R_{TcRc}$) are all known, while the values of the vectors ($R_{TCO}$, $R_{RCO}$, $R_{T1O}$, $R_{T2O}$) and the angle $\theta_{Object}$ are unknown. However, because the signals that reflect off of the object share a common path along $R_{RCO}$, the difference in arrival times at the receiver is entirely due to the difference in length of the vectors $R_{T1O}$ and $R_{T2O}$. As with the case of locating the receiver, this information is enough to allow the angle of the object relative to the transmitters to be calculated. In two dimensions, the differential range measurements and the angle relative to the TX center are related by the equation:

$$|R_{T1O}|-|R_{T2O}|=(|a_1-a_2|)\sin\theta_{Object}.$$

As stated above with reference to FIG. 2, if the receiver clocks 31 and 32 are synchronized with the transmitter clocks 2 and 3, respectively, it is possible to determine not only the relative difference in arrival time of the signals from each transmitter, and consequently the angular position of the object, but also the absolute arrival time of the transmitted signals, which, in conjunction with the position of the receiver, gives the range of the object. However, unlike the calculation used to determine the range of the receiver, this calculation requires the simultaneous solution of intersecting ellipses. Methods exist, such as, for example, the gradient descent and Newton-Raphson methods, that are suitable for use with the invention to solve the resulting set of equations. Those skilled in the art will understand the manner in which these or other methods may be used to make these calculations. As described above with reference to FIG. 5, this two-dimensional system can be extended easily to three dimensions by using one or more additional transmitters.

Figure 7:
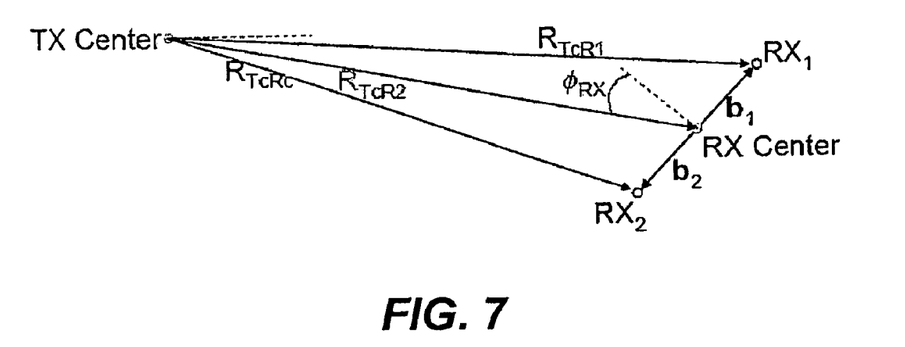
FIG. 7 is a diagram that illustrates the relationships in two dimensions between the transmitters and the receivers in the case where multiple receivers are used.

FIG. 7 is a diagram that illustrates the relationships in two dimensions between the overall phase center, TX Center, of two more transmitters and two receivers $RX_1$ and $RX_2$. In this embodiment, the receiver is made up of a set of spatially distributed receivers $RX_1$ and $RX_2$ having receive-antennas that have a known distance ($|b_1-b_2|$) between them. This configuration enables the receiver to compute the differential distance ($|R_{TcR1}|-|R_{TcR2}|$) from TX Center to the two receive antennas of receiver $RX_1$ and $RX_2$, as well as the angle $\phi_{RX}$, which is the angle between the dashed line perpendicular to the line between the receivers and the line from TX Center to RX Center. These range and angle values may be obtained by measuring the difference in time-of-arrival of the signals from each antenna and dividing by the speed of the signal propagation. In two dimensions, the differential range measurements and the angle relative to the TX Center are related by the equation:

$$|R_{TcR1}|-|R_{TcR2}|=(|b_1-b_2|)\sin \phi_{RX}.$$

If polarization encoding is used, receiver orientation can be determined using the relative polarization of the multiple receive antennas. For example, if three receive antennas are polarized in a particular sense, such as horizontal polarization, for example, and the antennas are oriented such that the preferred polarizations are rotated in angle relative to each antenna, then each antenna will convey unique polarization information that will permit the orientation of the plane defined by the three receive antennas to be computed. By implementing polarization encoding along with timing information, the orientation of a plane defined by three receivers is over-determined and thus, the combination of information will provide additional accuracy. As described above, this two-dimensional system can be extended easily to three dimensions.

Figure 8:
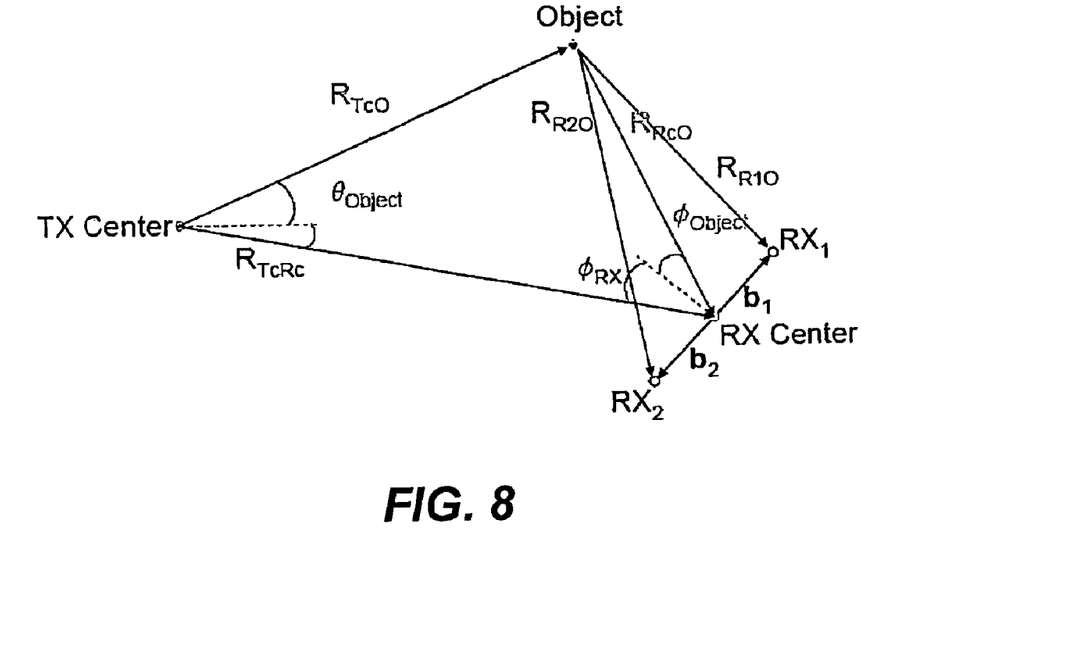
FIG. 8 is a diagram that illustrates the relationships in two dimensions, between TX Center, two receive antennas and an object being tracked.

FIG. 8 is a diagram that illustrates the relationships in two dimensions between TX Center, two receive antennas, $RX_1$ and $RX_2$, and an object being tracked in two dimensions. The TX Center may correspond to one transmitter or two or more SD transmitters. As described above, the SD receiver is capable of calculating its own position and orientation with respect to the TX Center as well as the position, velocity and range of the object with respect to the receiver. In addition, as illustrated in FIG. 8, the object's angular position $\phi_{Object}$ can be determined from the difference in path lengths, $|R_{R2O}|-|R_{R1O}|$, from the object to a set of spatially distributed receivers $RX_1$ and $RX_2$ having a known distance between them, $|b_1-b_2|$. The receiver can compute the differential distance to the two antennas $|R_{TcR1}|-|R_{TcR2}|$ and the angle $\phi_{RX}$, which is the angle between the line perpendicular to the line between the receivers and the line from the object to the receiver center, RX Center. This may be accomplished by measuring the difference in time-of-arrival of the signals from each antenna and dividing those values by the speed of the signal propagation. In two dimensions, the differential range measurements and the angle relative to the RX Center are related by the following equation:

$$|R_{R1O}|-|R_{R2O}|=(|b_1-b_2|)\sin \phi_{Object}.$$

As stated above, if the receiver clocks are synchronized with the transmitter clocks at launch, it is possible to determine not only the relative difference in arrival time of the signals from each transmitter and consequently the angular position of the object, but also the absolute arrival time of the transmitted signals, which, in conjunction with the position of the receiver, gives the range of the object $|R_{RcO}|$ relative to the RX Center. However, this calculation requires the simultaneous solution of intersecting ellipses. Consequently, the solution may require non-linear optimization techniques such as, for example, the gradient descent and Newton-Raphson methods. As indicated above, this two-dimensional system can be extended easily to three dimensions by using one or more additional receivers.

Until this point, the calculation of the object position has been described as a calculation using either the difference in path lengths from a distributed transmitter to the object or the difference in paths lengths from a distributed receiver to the object. Independent measurement of each path provides an additional factor of improvement in angle resolution over the previous concept where only one-way path length is used for angle determination. When the transmitters and receivers are co-located, there is a factor of two improvement in angle resolution due to the two-way path phase determination at each of the two receivers. Other geometries with known transmitter and receiver locations will provide a factor of angle resolution improvement that depends on the nature of the geometry. For co-located transmitters and receivers, the angle resolution improvement translates into a reduction in the interferometer baseline or into a significant improvement in signal-to-noise ratio (SNR), which would allow transmit power to be reduced.

Figure 9:
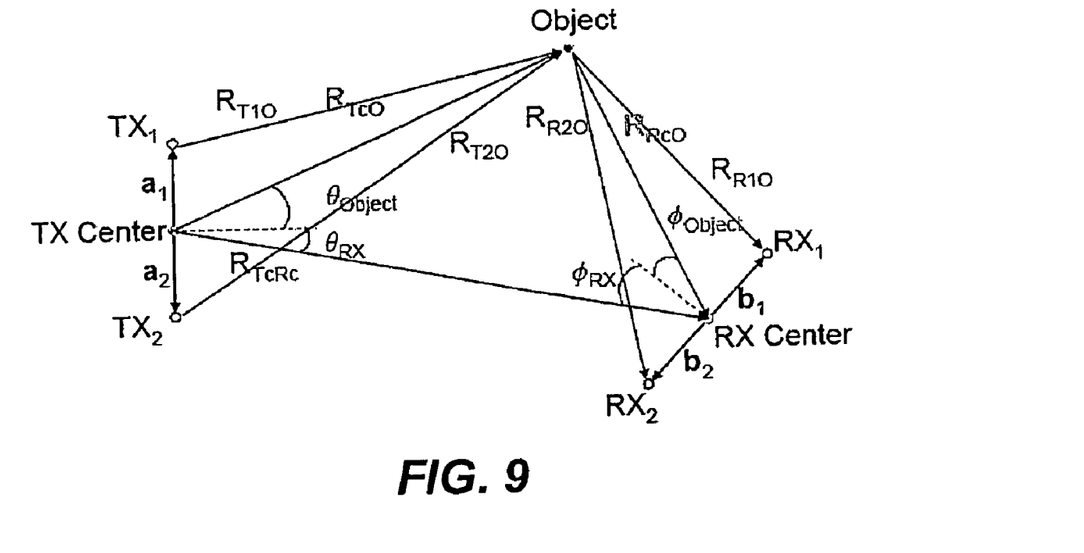
FIG. 9 is a diagram that illustrates the relationships in two dimensions between two spatially distributed transmitters TX1 and TX2, two spatially distributed receive antennas, RX1 and RX2, and the object being tracked.

FIG. 9 is a diagram that illustrates the relationships in two dimensions between two SD transmitters $TX_1$ and $TX_2$, two SD receive antennas, $RX_1$ and $RX_2$, and the object being tracked. The manner in which the position of an object can be calculated using the path length differences resulting from the use of both distributed transmitters and distributed receivers will now be described with reference to FIG. 9. In this example, it is assumed that the values of the vectors $a_1$, $a_2$, $R_{TcRc}$ are all known, while the values of the vectors $R_{TcO}$, $R_{RcO}$, $R_{T1O}$, $R_{T2O}$ and the angle $\theta_{Object}$ are unknown. However, because the signals that reflect off of the object share a common path along $R_{RcO}$, the difference in arrival times at the receiver is entirely due to the difference in the lengths of the vectors $R_{T1O}$ and $R_{T2O}$. This information is enough to allow the angle of the object, $\theta_{Object}$, relative to TX Center to be calculated. In two dimensions, the differential range measurements and the angle of the object relative to TX Center are related by the equation:

$$|R_{T1O}|-|R_{T2O}|=(|a_1-a_2|)\sin \theta_{Object}.$$

As described above with reference to FIG. 5, this two-dimensional system can be extended easily to three dimensions.

With reference again to FIGS. 1 and 2, the system may be designed to operate as an X-band (i.e., 10 GHz electromagnetic radiation or radio frequency) system. The modulation bandwidth is nominally 20 MHz. As stated above, the receiver 20 will typically be mounted on a missile, while the object to be located is a target to be intercepted by the missile.

The effective operating range of the system may be determined by the standard radar range equation, $$SNR = \frac{P_T G_T \lambda^2}{4\pi} \cdot \frac{\sigma_{rcs}}{4\pi(R_{TxtoThreat})^2 4\pi(R_{Object\,toRX})^2} \cdot \frac{G_R L_R}{NF_R KTB} \cdot G_c N_p,$$

where $P_T$ is the transmit power, $G_T$ is the gain of the transmit antenna, $\sigma_{RCS}$ is the cross section of the object, $G_R$ is the gain of the relevant receiver antenna, $L_R$ accounts for other receiver losses, $NF_R$ is the receiver noise figure, KTB is the noise energy, $G_C$ is the coding gain, $N_P$ is the number of coherently integrated pulses, $R_{TX\,to\,Object}$ is the distance from the transmitter to the object and $R_{Object\,to\,RX}$ is the distance from the object to the receiver.

This configuration differs from a typical radar system in at least one respect in that instead of using the monostatic radar range equation, with $1/R^4$ determining SNR at the receiver, the bistatic range equation with separate uplink and downlink paths is used. Since the system of the invention can effectively operate as a one-way system, as opposed to a monostatic radar system which operates as a two-way system, the invention can operate effectively with only a minor increase in power aperture (e.g., about a 12 dB) to extend the engagement range from, for example, about 1 km to 4 km. If the power aperture is extended to, for example, about 18 dB, the range can be extended to, for example, about 8 km.

As an example, reducing the angular coverage to 60° in azimuth provides an 8-dB increase in power-aperture, and doubling the peak power, length of the codes, and the number of pulses provides an additional 9 dB in power-aperture. The improvement due to increasing the baseline is subtler. The 1-sigma angle error is given by $$\sigma_\theta = \frac{\lambda}{2\pi D \sqrt{SNR}}.$$

Increasing the baseline D by a factor k is equivalent to increasing the SNR by $k^2$. Thus, if the baseline is doubled, then the equivalent power-aperture performance may be increased by 6 dB in this example. Of course, the invention is not limited to these power apertures or ranges, which will depend on a variety of factors relating to the manner in which the system is implemented and configured.

Figure 10:
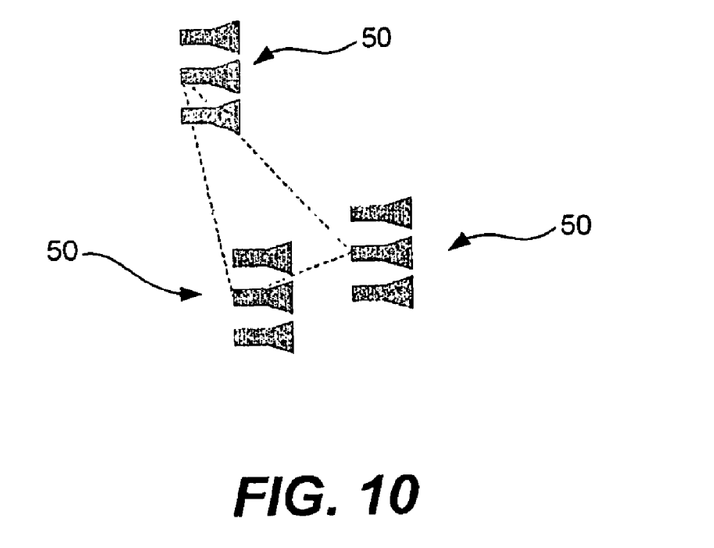
FIGS. 10 and 11 illustrate examples of possible three-dimensional transmitter antenna configurations.
Figure 11:
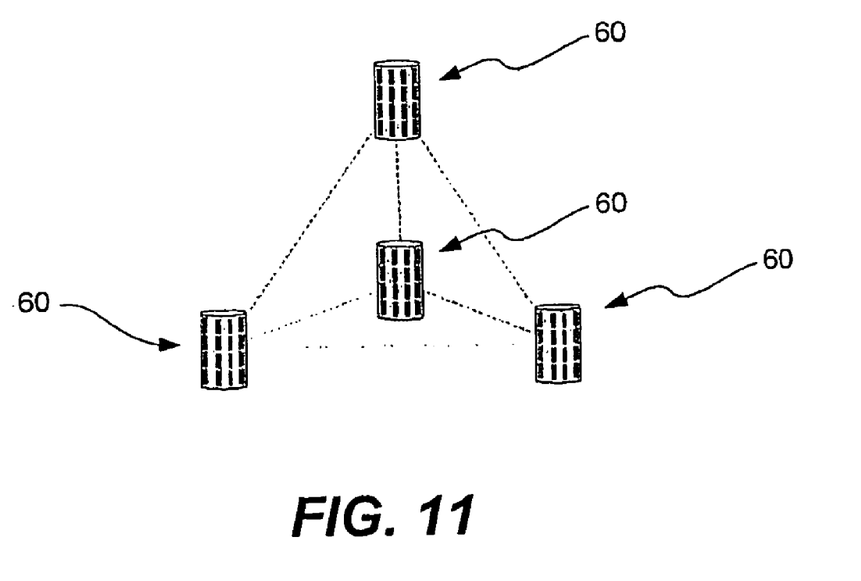

It is important to determine the optimal configuration of the transmitter antennas such that triangulation is possible and accurate in three dimensions. FIGS. 10 and 11 illustrate a few examples of possible transmitter antenna configurations. It can be shown that the angle error is inversely proportional to the effective baseline (EB), which can be defined as EB=D cos θ. As the real angle of the object being tracked becomes larger, any error present in the measurement may be amplified. Therefore, it is typically advantageous to arrange the transmit antennas so that objects of interest are not likely to be coplanar with the antennas (i.e., θ=90°). There are multiple ways to accomplish this, such as: (1) tilt a coplanar set of antennas 50, as shown in FIG. 10, so that threats and interceptors are always located within a region that provides good performance, or (2) arrange multiple antennas 60 so that all regions are covered by a subset of antennas, as shown in FIG. 11. The tilted plane of antennas 50 shown in FIG. 10 lacks omni-directional coverage. However, the directional nature of the approach permits higher-gain transmit-antennas to be used. The tetrahedral configuration of the antennas 60 shown in FIG. 11 limits the available antenna designs and many solutions may not be able to handle the transmit power requirements due to low antenna gain.

Another advantage of the invention is that it does not require communication between the transmitters and a compatible receiver. Another advantage of the invention is that it does not require a receiver to be co-located with the transmitters. As described above, however, if a receiver is co-located with the transmitters, radar functionality can be achieved. Another advantage of the invention is that it enables multiple receivers to be used to simultaneously detect multiple objects.

Figure 12:
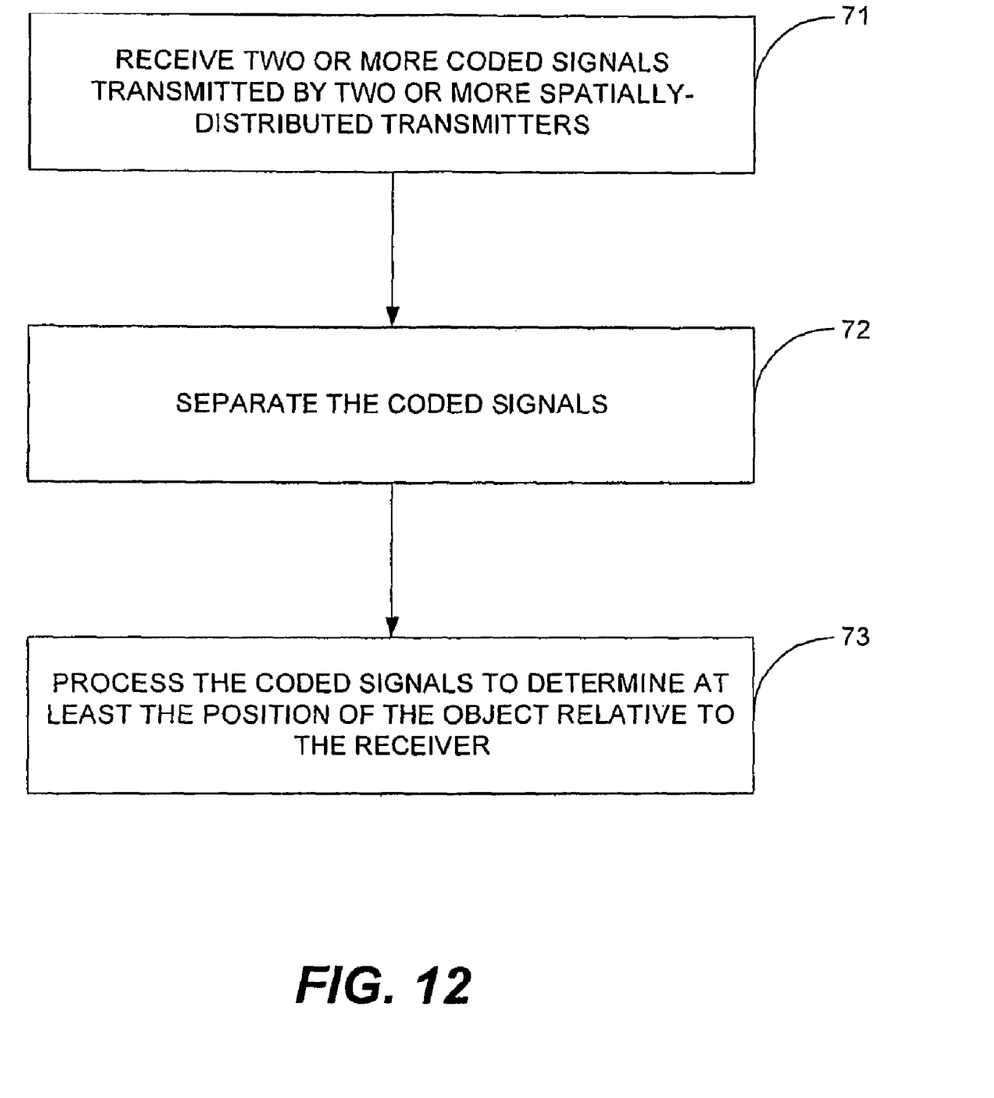
FIG. 12 illustrates a flowchart that represents the method of the invention in accordance with an exemplary embodiment performed by the receiver show in FIG. 2.

FIG. 12 illustrates a flowchart that represent the method of the invention in accordance with an exemplary embodiment. At least one receiver receives two or more coded signals from two or more respective transmitters of a SD transmitter, as indicated by block 71. The receiver separates the coded signals, as indicated by block 72. A processor of the receiver processes the separated signals to determine at least the position of the object relative to the receiver, as indicated by block 73. As described above, the receiver is capable of determining the position, velocity and range of the object relative to the receiver as well as the position and orientation of the receiver relative to the SD transmitter. Also, multiple transmitters and multiple receivers may be used to enhance or optimize performance of the system.

The method steps represented by blocks 72 and 73 are typically performed in software and/or firmware that is stored in a computer-readable medium and executed by a processor of the receiver. The computer-readable medium may be any type of storage device including, for example, random access memory (RAM), read only memory (ROM), etc. The instructions may be software or firmware, or a combination of software and firmware. The processor may be any type of computational device including, for example, a microprocessor, an application specific integrated circuit (ASIC), a microcontroller, a programmable logic array (PLA), a programmable gate array (PGA), etc.

It should be noted that the invention has been described with reference to particular embodiments for exemplary purposes. The invention is not limited to the embodiments described herein. As will be understood by those skilled in the art, modifications can be made to the embodiments described herein, and all such modifications are within the scope of the invention.

What is claimed is:

1. A system for locating one or more non-cooperative objects, the system comprising:
a spatially-distributed (SD) transmitter system comprising at least first and second transmitters that are spatially separated from each other, each transmitter transmitting a coded signal, the coded signals being coded with different codes that enable the coded signals to be distinguishable from each other; and
at least a first receiver, the first receiver being configured to receive the coded signals and separate the coded signals from one another, the received coded signals including coded signals transmitted by the transmitters without being reflected by a non-cooperative object and coded signals transmitted by the transmitters that have been reflected by the non-cooperative object, the receiver including a processor that processes the separated signals to determine at least a position of the non-cooperative object relative to the receiver and an angular position of the object relative to the SD transmitter system.

2. The system of claim 1, wherein when the processor of the receiver processes the separated coded signals, the processor also determines an angular position of the receiver relative to the SD transmitter system.

3. The system of claim 2, wherein when the processor of the receiver processes the separated coded signals, the processor also determines a range of the object from the receiver.

4. The system of claim 2, wherein when the processor of the receiver processes the separated coded signals, the processor also determines the motion of the receiver relative to the SD transmitter system.

5. The system of claim 4, wherein when the processor of the receiver processes the separated coded signals, the processor also determines a pitch, roll and yaw of the receiver.

6. The system of claim 1, wherein the receiver and the SD transmitter system are at fixed positions relative to each other.

7. The system of claim 1, wherein when the processor of the receiver processes the separated coded signals, the processor also determines a velocity of the object.

8. The system of claim 1, wherein the processor of the receiver determines at least the position of the object relative to the receiver by:
   determining a time-of-arrival (TOA) of each of the coded signals;
   calculating a difference between the TOAs;
   dividing the difference by a known propagation speed of the coded signals to obtain a respective path length from each of said first and second transmitters to the receiver;
   using the path lengths to determine a range from the receiver to a phase center of the SD transmitter system and an angular position of the receiver relative to a phase center of the SD transmitter system; and
   using one or more of the path lengths, the range and the angular position to determine a range from the receiver to the object and an angular position of the object relative to the receiver.

9. The system of claim 1, wherein the transmitted signals are coded with codes that are orthogonal or at least nearly orthogonal to each other.

10. The system of claim 1, wherein the SD transmitter system further comprises at least a third transmitter that is spatially separated from the first and second transmitters, the third transmitter transmitting a coded signal, the coded signal transmitted by the third transmitter being coded with a code that is different from the codes that are used to code the coded signals transmitted by the first and second transmitters to enable all of the coded signals to be distinguishable from each other, and wherein the processor of the receiver processes the separated coded signals to determine at least a position of the object relative to the receiver, a velocity of the object, and a range from the receiver to the object.

11. The system of claim 1, wherein the receiver is mounted on a mobile platform that uses the position of the object determined by the processor to locate and track the object.

12. The system of claim 1, further comprising:
   at least a second receiver, the second receiver being configured to receive the coded signals and separate the coded signals from one another, the received coded signals including coded signals transmitted by the transmitters without being reflected by the object and coded signals transmitted by the transmitters that have been reflected by the object, the second receiver including a processor that processes the separated coded signals to determine at least a position of the object relative to a phase center of the first and second receivers, a velocity of the object, and a range of the object from the phase center of the first and second receivers.

13. The system of claim 12, wherein the system is capable of simultaneously determining at least respective positions of multiple respective non-cooperative objects.

14. A method for locating one or more non-cooperative objects comprising:
   receiving two or more coded signals in a receiver, the coded signals being transmitted by two or more transmitters of a spatially-distributed (SD) transmitter system, the coded signals being coded with different codes that enable the coded signals to be distinguishable from each other, the received coded signals including coded signals transmitted by the transmitters without being reflected by a non-cooperative object and coded signals transmitted by the transmitters that have been reflected by the cooperative object;
   in the receiver, separating the coded signals from one another; and
   in a processor of the receiver, processing the separated signals to determine at least a position of the object relative to the receiver and angular position of the object relative to the SD transmitter system.

15. The method of claim 14, wherein said processing the separated signals by the processor comprises:
   determining a time-of-arrival (TOA) of each of the coded signals;
   calculating a difference between the TOAs;
   dividing the difference by a known propagation speed of the coded signals to obtain a respective path length from each of the first and second transmitters to the receiver;
   using the path lengths to determine a range from the receiver to a phase center of the SD transmitter system and an angular position of the receiver relative to a phase center of the SD transmitter system; and
   using one or more of the path lengths, the range and the angular position to determine a range from the receiver to the object and an angular position of the object relative to the receiver.

16. The method of claim 14, wherein when the processor of the receiver processes the separated coded signals, the processor also determines an angular position of the receiver relative to the SD transmitter system.

17. The method of claim 16, wherein when the processor of the receiver processes the separated coded signals, the processor also determines a range of the object from the receiver.

18. The method of claim 16, wherein when the processor of the receiver processes the separated coded signals, the processor also determines the motion of the receiver relative to the SD transmitter system.

19. The method of claim 14, wherein the receiver and the SD transmitter system are at fixed positions relative to each other.

20. The method of claim 14, wherein when the separated signals are processed by the processor, the processor also determines a pitch, roll and yaw of the receiver.

21. The method of claim 14, wherein the transmitted signals are coded with codes that are orthogonal or at least nearly orthogonal to each other.

22. The method of claim 14, wherein the receiver is mounted on a mobile platform that uses the position of the object determined by the processor to locate and track the object.

23. A system for locating one or more non-cooperative objects, the system comprising:
   a spatially-distributed (SD) transmitter system comprising at least first and second transmitters that are spatially separated from each other, each transmitter transmitting a coded signal, the coded signals being coded with different codes that enable the coded signals to be distinguishable from each other; and
   at least a first receiver, the first receiver being configured to receive the coded signals and separate the coded signals from one another, the received coded signals including coded signals transmitted by the transmitters without being reflected by a non-cooperative object and coded signals transmitted by the transmitters that have been reflected by the non-cooperative object, the receiver including a processor that processes the separated signals to determine at least an angular position of the non-cooperative object relative to the SD transmitter system and an angular position of the receiver relative to the SD transmitter system.

24. The system of claim 23, wherein when the processor of the receiver processes the separated coded signals, the processor also determines a range of the receiver relative to the SD transmitter system.

25. The system of claim 24, wherein when the processor of the receiver processes the separated coded signals, the processor also determines an angular position of the object relative to the receiver.

26. A computer program for locating one or more non-cooperative objects, the program being stored on a computer-readable medium, the program comprising:

instructions for separating two or more coded signals transmitted by two or more respective transmitters of a spatially-distributed (SD) transmitter system, the coded signals being coded with different codes that enable the coded signals to be distinguishable from each other, the received coded signals including coded signals transmitted by the transmitters without being reflected by a non-cooperative object and coded signals transmitted by the transmitters that have been reflected by the non-cooperative object; and instructions for processing the separated signals to determine at least a position of the object relative to the receiver and an angular position of the object relative to the SD transmitter system.

27. The program of claim 26, wherein the instructions for processing the separated signals comprise:

instructions that process the separated signals to determine a time-of-arrival (TOA) of each of the coded signals;

instructions that process the TOAs to calculate a difference between the TOAs;

instructions that divide the difference by a known propagation speed of the coded signals to obtain a respective path length from each of the first and second transmitters to the receiver;

instructions that process the path lengths to determine a range from the receiver to a phase center of the SD transmitter system and an angular position of the receiver relative to a phase center of the SD transmitter system; and instructions that process one or more of the path lengths, the range and the angular position to determine a range from the receiver to the object and an angular position of the object relative to the receiver.

28. A system for locating one or more non-cooperative objects, the system comprising:

a spatially-distributed (SD) transmitter system comprising at least first and second transmitters that are spatially separated from each other, each transmitter transmitting a coded signal, the coded signals being coded with different codes that enable the coded signals to be distinguishable from each other; and at least a first receiver, the first receiver being configured to receive the coded signal and separate the coded signals from one another, the receiver coded signals including coded signals transmitted by the transmitters without being reflected by a non-cooperative object and coded signal transmitted by the transmitters that have been reflected by the non-cooperative object, the receiver including a processor that processes the separated signals to determine at least a position of the non-cooperative object relative to the receiver, and angular position of the object relative to the SD transmitter system, and an angular position of the receiver relative to the SD transmitter system.

29. The system of claim 28, wherein when the processor of the receiver processes the separated coded signals, the processor also determines a range of the object from the receiver.

* * * * *